United States Patent
Zhong et al.

(10) Patent No.: US 12,526,907 B2
(45) Date of Patent: Jan. 13, 2026

(54) X-RAY DETECTOR COMPRISING A NETWORK CHIP, A POWER SUPPLY, AND A SENSING CIRCUIT, AND X-RAY DETECTING SYSTEM

(71) Applicants: Beijing BOE Optoelectronics Technology Co., Ltd., Beijing (CN); BOE TECHNOLOGY GROUP CO., LTD., Beijing (CN)

(72) Inventors: Wenjie Zhong, Beijing (CN); Bo Fu, Beijing (CN); Jiajia Xin, Beijing (CN); Guo Liu, Beijing (CN); Yonghui Wang, Beijing (CN); Chen Meng, Beijing (CN); Binghai Zhu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 233 days.

(21) Appl. No.: 18/028,933

(22) PCT Filed: Jun. 29, 2022

(86) PCT No.: PCT/CN2022/102485
§ 371 (c)(1),
(2) Date: Mar. 28, 2023

(87) PCT Pub. No.: WO2024/000307
PCT Pub. Date: Jan. 4, 2024

(65) Prior Publication Data
US 2025/0081318 A1     Mar. 6, 2025

(51) Int. Cl.
*H05G 1/64*     (2006.01)
*G01T 1/175*     (2006.01)
*G01T 1/20*     (2006.01)

(52) U.S. Cl.
CPC ............... *H05G 1/64* (2013.01); *G01T 1/175* (2013.01); *G01T 1/20184* (2020.05)

(58) Field of Classification Search
CPC ....... A61B 6/42; A61B 6/4208; A61B 6/4225; A61B 6/4233; A61B 6/4241;
(Continued)

(56) References Cited

U.S. PATENT DOCUMENTS

| 5,809,223 A | 9/1998 | Lee et al. |
| 7,109,491 B2 * | 9/2006 | Shinden ............... A61B 6/4233 250/370.09 |

(Continued)

FOREIGN PATENT DOCUMENTS

| CN | 101119559 A | 2/2008 |
| CN | 201594223 U | 9/2010 |

(Continued)

*Primary Examiner* — Allen C. Ho
(74) *Attorney, Agent, or Firm* — WHDA, LLP

(57) ABSTRACT

An X-ray detector includes a network chip, a power supply and a sensing circuit; the sensing circuit includes a power-supply managing chip, and the power-supply managing chip is electrically connected to the network chip and the power supply; the power supply is configured for supplying electric power to the network chip and the power-supply managing chip of the sensing circuit; the power-supply managing chip is configured for, when turned on, supplying electric power to the sensing circuit; the sensing circuit is configured for, when receiving a sleeping instruction sent by an external device or is not in an operating state, turning off the power-supply managing chip, to enter a sleeping state; and the network chip is configured for, when receiving an operation instruction sent by the external device, controlling (Continued)

the power-supply managing chip to be turned on, whereby the sensing circuit exits the sleeping state.

12 Claims, 12 Drawing Sheets

(58) Field of Classification Search
CPC ....... A61B 6/4266; A61B 6/4283; G01T 1/17; G01T 1/175; G01T 1/20; G01T 1/2018; G01T 1/20182; G01T 1/20184; G01T 1/20188; G01T 1/24; G01T 1/243; G01T 1/244; G01T 1/246; G01T 1/247; G01T 1/248; H05G 1/64
USPC ................. 378/91, 98.8, 101, 102, 105–112, 378/114–118; 250/370.09
See application file for complete search history.

(56) References Cited

U.S. PATENT DOCUMENTS

| | | | | |
|---|---|---|---|---|
| 7,239,685 | B2* | 7/2007 | Petrick | G01T 1/2985 378/116 |
| 7,261,465 | B2* | 8/2007 | Butzine | A61B 6/566 378/189 |
| 7,356,121 | B2* | 4/2008 | Schwarz | H05G 1/10 378/101 |
| 7,409,564 | B2* | 8/2008 | Kump | G01T 1/17 713/320 |
| 7,545,914 | B2* | 6/2009 | Kito | A61B 6/4494 378/207 |
| 7,561,668 | B2* | 7/2009 | Ohta | G03B 42/04 378/102 |
| 7,712,959 | B2* | 5/2010 | Tanabe | H01J 31/49 378/189 |
| 7,732,779 | B2* | 6/2010 | Kito | G01T 7/00 250/370.09 |
| 7,864,923 | B2* | 1/2011 | Ohta | G03B 42/04 378/102 |
| 7,991,119 | B2* | 8/2011 | Yoshida | G01T 1/00 378/114 |
| 8,080,802 | B2* | 12/2011 | Nishino | A61B 6/4233 250/370.08 |
| 8,113,712 | B2* | 2/2012 | Tanabe | A61B 6/548 378/189 |
| 8,334,516 | B2* | 12/2012 | Tsubota | A61B 6/548 250/370.08 |
| 8,357,908 | B2* | 1/2013 | Kuwabara | A61B 6/548 250/370.08 |
| 8,649,482 | B2* | 2/2014 | Abe | A61B 6/4411 378/91 |
| 8,654,926 | B2* | 2/2014 | Ohta | G01T 1/24 378/114 |
| 8,798,235 | B2* | 8/2014 | Ohta | A61B 6/4494 378/102 |
| 8,798,236 | B2* | 8/2014 | Ohta | A61B 6/4494 378/102 |
| 10,149,659 | B1* | 12/2018 | Schwartz | A61B 6/54 |
| 10,209,370 | B2* | 2/2019 | Sato | G01T 1/175 |
| 10,254,163 | B1* | 4/2019 | Cherlin | G01T 1/2928 |
| 10,534,096 | B1* | 1/2020 | Hugg | G01T 1/2985 |
| 10,598,801 | B2* | 3/2020 | Hugg | G01T 1/243 |
| 10,722,198 | B2* | 7/2020 | Wirth | G06K 7/1417 |
| 10,736,600 | B2* | 8/2020 | Allen | G06F 16/5866 |
| 11,432,782 | B2* | 9/2022 | Spartiotis | A61B 6/512 |
| 11,818,828 | B2* | 11/2023 | Tao | H05G 1/10 |
| 2019/0155355 | A1 | 5/2019 | Wen et al. | |
| 2021/0368610 | A1 | 11/2021 | Tao et al. | |

FOREIGN PATENT DOCUMENTS

| | | |
|---|---|---|
| CN | 109803356 A | 5/2019 |
| CN | 109828506 A | 5/2019 |
| CN | 110165738 A | 8/2019 |
| CN | 209766595 U | 12/2019 |
| CN | 110797930 A | 2/2020 |
| CN | 112330905 A | 2/2021 |
| CN | 113708428 A | 11/2021 |
| CN | 114498804 A | 5/2022 |
| CN | 216485106 U | 5/2022 |
| CN | 218099788 U | 12/2022 |

* cited by examiner

X-RAY DETECTOR COMPRISING A NETWORK CHIP, A POWER SUPPLY, AND A SENSING CIRCUIT, AND X-RAY DETECTING SYSTEM

TECHNICAL FIELD

The present disclosure relates to the technical field of X-ray detecting devices, and particularly relates to an X-ray detector and an X-ray detecting system.

BACKGROUND

X-ray detecting devices, because of their advantages such as a high imaging speed, a high resolution and a high signal-to-noise ratio, are extensively applied in fields such as medical video, industrial detection and security detection. Their operating principle is that a scintillator layer, when exposed to X-ray, converts the X-ray photons into visible light, and subsequently an amorphous-silicon layer having the function of a photodiode converts it into a charge signal. In image collection, a driving circuit reads the charge by means of line-by-line scanning, an analog-digital converting chip converts them into a digital signal, and the digital signal undergoes serial-parallel conversion, is transmitted to an upper computer, and undergoes image algorithm processing, to finally complete the image displaying, storage and analysis.

SUMMARY

The present disclosure provides an X-ray detector and an X-ray detecting system.

Some embodiments of the present disclosure provide an X-ray detector, wherein the X-ray detector comprises a network chip, a power supply and a sensing circuit;
the sensing circuit comprises a power-supply managing chip, and the power-supply managing chip is electrically connected to the network chip and the power supply;
the power supply is configured for supplying electric power to the network chip and the power-supply managing chip of the sensing circuit;
the power-supply managing chip is configured for, when turned on, supplying electric power to the sensing circuit;
the sensing circuit is configured for, when receiving a sleeping instruction sent by an external device or is not in an operating state, turning off the power-supply managing chip, to enter a sleeping state; and
the network chip is configured for, when receiving an operation instruction sent by the external device, controlling the power-supply managing chip to be turned on, whereby the sensing circuit exits the sleeping state.

Optionally, the X-ray detector further comprises a sleeping awakening circuit, and the sleeping awakening circuit comprises at least: a first voltage inputting interface electrically connected to the sensing circuit, a second voltage inputting interface electrically connected to the network chip, and a voltage outputting interface connected to a relay between the power-supply managing chip and the power supply;
the sensing circuit is configured for, when is in the operating state and has not received the sleeping instruction sent by the external device, inputting a high-level signal to the first voltage inputting interface; and when is not in the operating state or has received the sleeping instruction sent by the external device, inputting a high-level signal to the first voltage inputting interface, and controlling the network chip to input a low-level signal to the second voltage inputting interface, and subsequently input a low-level signal to the first voltage inputting interface;
the network chip is further configured for, when receiving the operation instruction sent by the external device, controlling the sensing circuit to input a high-level signal to the first voltage inputting interface; and
the sleeping awakening circuit is configured for, when the first voltage inputting interface or the second voltage inputting interface is inputted the high-level signal, outputting a low-level signal to the voltage outputting interface, to drive the relay to connect an electric-power supplying circuit between the power-supply managing chip and the power supply, whereby the sensing circuit is powered on; and when both of the first voltage inputting interface and the second voltage inputting interface are inputted the low-level signal, outputting a high-level signal to the voltage outputting interface, to control the relay to disconnect the electric-power supplying circuit between the power-supply managing chip and the power supply, whereby the sensing circuit is powered off.

Optionally, the network chip is further configured for, after driven by the power supply to be powered on, controlling the sensing circuit to input a high-level signal to the first voltage inputting interface, to drive the relay to connect the electric-power supplying circuit between the power-supply managing chip and the power supply, whereby the sensing circuit is powered on.

Optionally, the network chip comprises a wired network chip and/or a wireless network chip.

Optionally, when the X-ray detector comprises the wired network chip and the wireless network chip, the first voltage inputting interface of the sleeping awakening circuit comprises: a first voltage inputting sub-interface electrically connected to the wired network chip, and a second voltage inputting sub-interface electrically connected to the wireless network chip; and
the sleeping awakening circuit is further configured for, when the first voltage inputting sub-interface or the second voltage inputting sub-interface or the second voltage inputting interface is inputted a high-level signal, outputting a low-level signal to the voltage outputting interface, to drive the relay to connect an electric-power supplying circuit between the power-supply managing chip and the power supply, whereby the sensing circuit is powered on; and when all of the first voltage inputting sub-interface, the second voltage inputting sub-interface and the second voltage inputting interface are inputted a low-level signal, outputting a high-level signal to the voltage outputting interface, to control the relay to disconnect the electric-power supplying circuit between the power-supply managing chip and the power supply, whereby the sensing circuit is powered off.

Optionally, the X-ray detector further comprises a non-self-locking switch circuit electrically connected to the power supply and configured for performing on-off controlling to the power supply.

Optionally, the non-self-locking switch circuit comprises at least a non-self-locking key, a key debouncing chip and a trigger that are electrically connected;

the non-self-locking key is configured for, each time pressed, bouncing, and outputting one pressing signal to the key debouncing chip;

the key debouncing chip is configured for performing debouncing processing to the pressing signal, and sending a clock-pulse signal to the trigger; and the trigger is configured for, each time receives one instance of the clock-pulse signal, changing an on-off state of the power supply one time.

Optionally, the sensing circuit comprises at least an FPGA chip, a ROIC chip, a GATE IC chip, a detecting panel and a buffer chip that are provided on a main control panel;

the FPGA chip and a PCB trace of a circuit board are provided on the main control panel in a parallel-winding mode;

the FPGA chip is configured for, when receiving the operation instruction sent by the external device, sending a configuring instruction and a time-sequence signal to the buffer chip, and sending a controlling signal and a time-sequence signal to the GATE IC chip;

the buffer chip is configured for sending in parallel the configuring instruction and the time-sequence signal to a plurality of channels of the ROIC chip;

the GATE IC chip is configured for, based on the controlling signal and the time-sequence signal, controlling the detecting panel to scan X-ray charge signals line by line;

the ROIC chip is configured for, based on the configuring instruction, completing self-configuration, and based on the time-sequence signal, reading the X-ray charge signals line by line from the GATE IC chip; and converting the X-ray charge signals into X-ray level signals; and the FPGA chip is configured for reading from the ROIC chip a plurality of lines of the X-ray level signals in parallel, and sending the X-ray level signals to the external device.

Optionally, a circuit board of the X-ray detector comprises a high-frequency-signal-element region, a low-frequency-signal-element region, a high-voltage-signal-element region and a low-voltage-signal-element region.

Optionally, wiring of the power supply is of a tree-like structure, whereby impedances from the power supply to the chips of the X-ray detector are equal.

Some embodiments of the present disclosure provide an X-ray detecting system, wherein the X-ray detecting system comprises a displaying device and the X-ray detector stated above, and the displaying device is communicatively connected to the X-ray detector via the network chip.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the prior art, the figures that are required to describe the embodiments or the prior art will be briefly described below. Apparently, the figures that are described below are embodiments of the present disclosure, and a person skilled in the art can obtain other figures according to these figures without paying creative work.

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
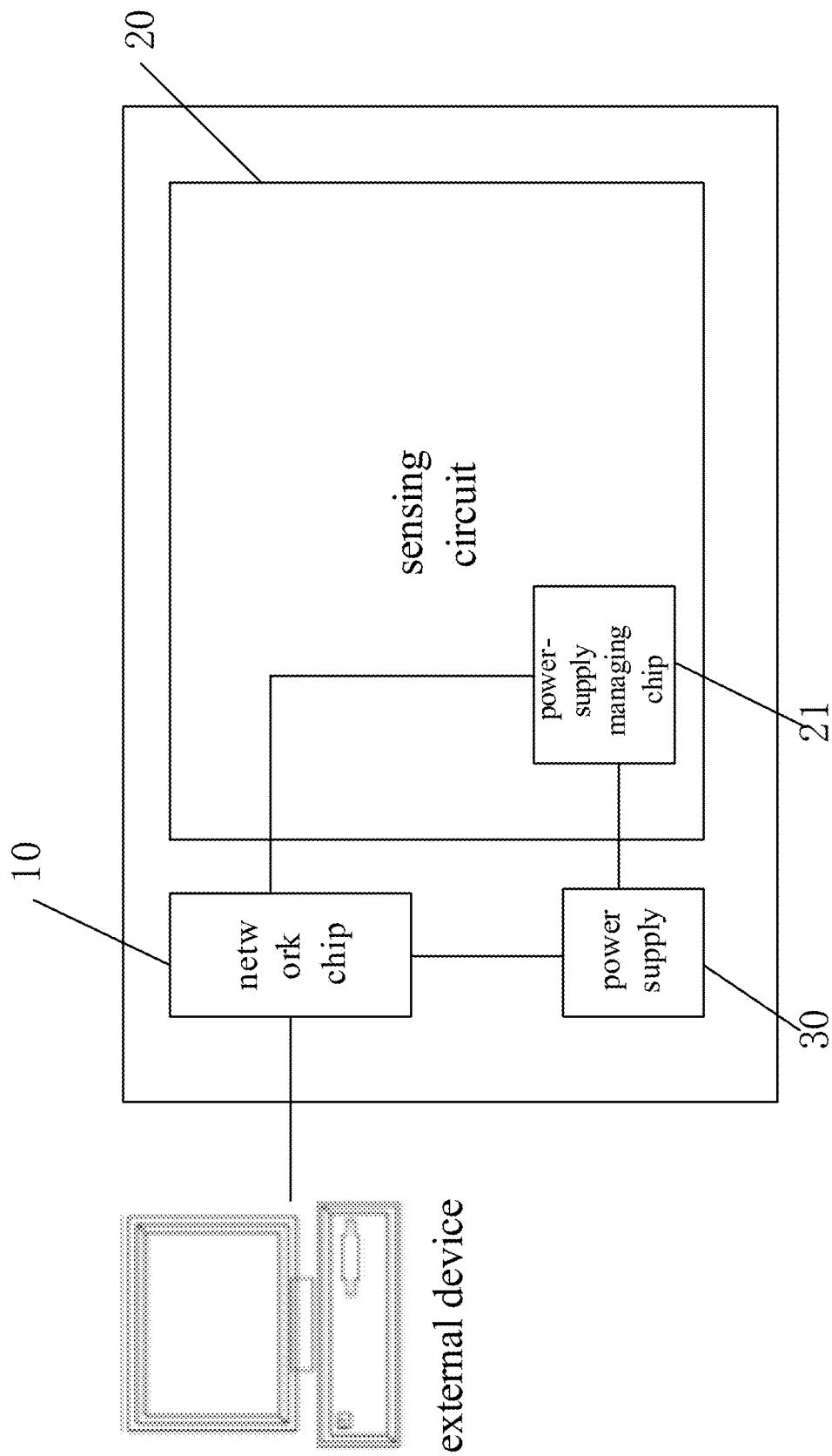
FIG. 1 schematically shows a schematic structural diagram of an X-ray detector according to some embodiments of the present disclosure.

FIG. 1 schematically shows a schematic structural diagram of an X-ray detector according to the present disclosure. The X-ray detector comprises a network chip 10, a sensing circuit 20 and a power supply 30. The sensing circuit 20 comprises a power-supply managing chip 21, and the power-supply managing chip 21 is electrically connected to the network chip 10 and the power supply 30.

It should be noted that the network chip 10 is an integrated-circuit chip that is provided in the X-ray detector and configured for performing network data transmission, and may be communicatively connected to an external device, so that the external device, via the network chip 10, performs remote data transmission with the X-ray detector, and performs remote controlling on the X-ray detector. The power supply 30 is an electric-power supplying device provided in the X-ray detector such as a battery or an adapter, and is configured for supplying electric energy to the X-ray detector, so that the X-ray detector can operate without an external electric-power access. The sensing circuit 20 is a functional circuit configured for performing X-ray detection, and may comprise component elements required to perform the X-ray detection, such as a sensing panel, a controlling chip, a sensor, a reading chip and a memory. As long as it can perform X-ray detection, it may be suitable for the present disclosure, and the particular internal elements and structures of the sensing circuit may be configured according to practical demands, and are not limited herein.

The power supply 30 is configured for supplying electric power to the network chip 10 and the power-supply managing chip 21 of the sensing circuit 20.

In an embodiment of the present disclosure, the power supply 30, when receives a turning-on signal, supplies electric power to the network chip 10 and a second electric-power supplying circuit of the power-supply managing chip 21 of the sensing circuit 20. The power-supply managing chip 21 is configured for converting the electric current inputted by the power supply 30 into a voltage suitable for the component elements of the sensing circuit 20, to power on the sensing circuit 20. Therefore, by performing on-off controlling to the power-supply managing chip 21, it can be effectively controlled whether the sensing circuit 20 operates or not.

The power-supply managing chip 21 is configured for, when turned on, supplying electric power to the sensing circuit 20.

In an embodiment of the present disclosure, the power-supply managing chip 21 supplies electric power to the sensing circuit 20 only when receives the turning-on signal, and, if it receives a turning-off signal, does not supply electric power to the sensing circuit 20.

The sensing circuit 20 is configured for, when receiving a sleeping instruction sent by an external device or is not in an operating state, turning off the power-supply managing chip 21, to enter a sleeping state.

In an embodiment of the present disclosure, when the sensing circuit 20 receives a sleeping instruction sent by the external device via the network chip 10, or, after powered on and turned on, does not receive an operation instruction sent by the external device, and thus is not in the operating state of performing X-ray detection, the sensing circuit 20 actively turns off its own power-supply managing chip 21, whereby the sensing circuit 20 is powered off, and enters the sleeping state.

The network chip 10 is configured for, when receiving an operation instruction sent by the external device, controlling the power-supply managing chip 21 to be turned on, whereby the sensing circuit 20 exits the sleeping state.

In an embodiment of the present disclosure, after the X-ray detector has been turned on, even if the sensing circuit 20 is in the sleeping state, the power supply 30 continuously supplies electric power to the network chip 10, and the clock of the network chip 10 operates. Therefore, the external device may send an operation instruction via the network chip 10, so that the network chip 10 controls the power-supply managing chip 21 to be turned on, whereby the power-supply managing chip 21 powers on the sensing circuit 20 again, to enable the sensing circuit 20 to be awakened from the sleeping state. It should be noted that, because the energy consumption of the network chip 10 is usually less than the energy consumption of the sensing circuit 20, by merely turning on the network chip 10 during the sleeping of the sensing circuit, the energy consumption of the X-ray detector can be greatly reduced.

In the embodiments of the present disclosure, by, after the X-ray detector has been turned on, always supplying electric power to the network chip by using the power supply, after the sensing circuit, because it does not receive the sleeping instruction or is not in the operating state, actively turns off the power-supply managing chip and enters the sleeping state, the operation instruction is sent to the network chip to cause the network chip to awaken the sensing circuit by turning on the power-supply managing chip, thereby realizing the function of sleeping and awakening of the X-ray detector, and reducing the energy consumption of the X-ray detector after it is turned on.

Figure 2:
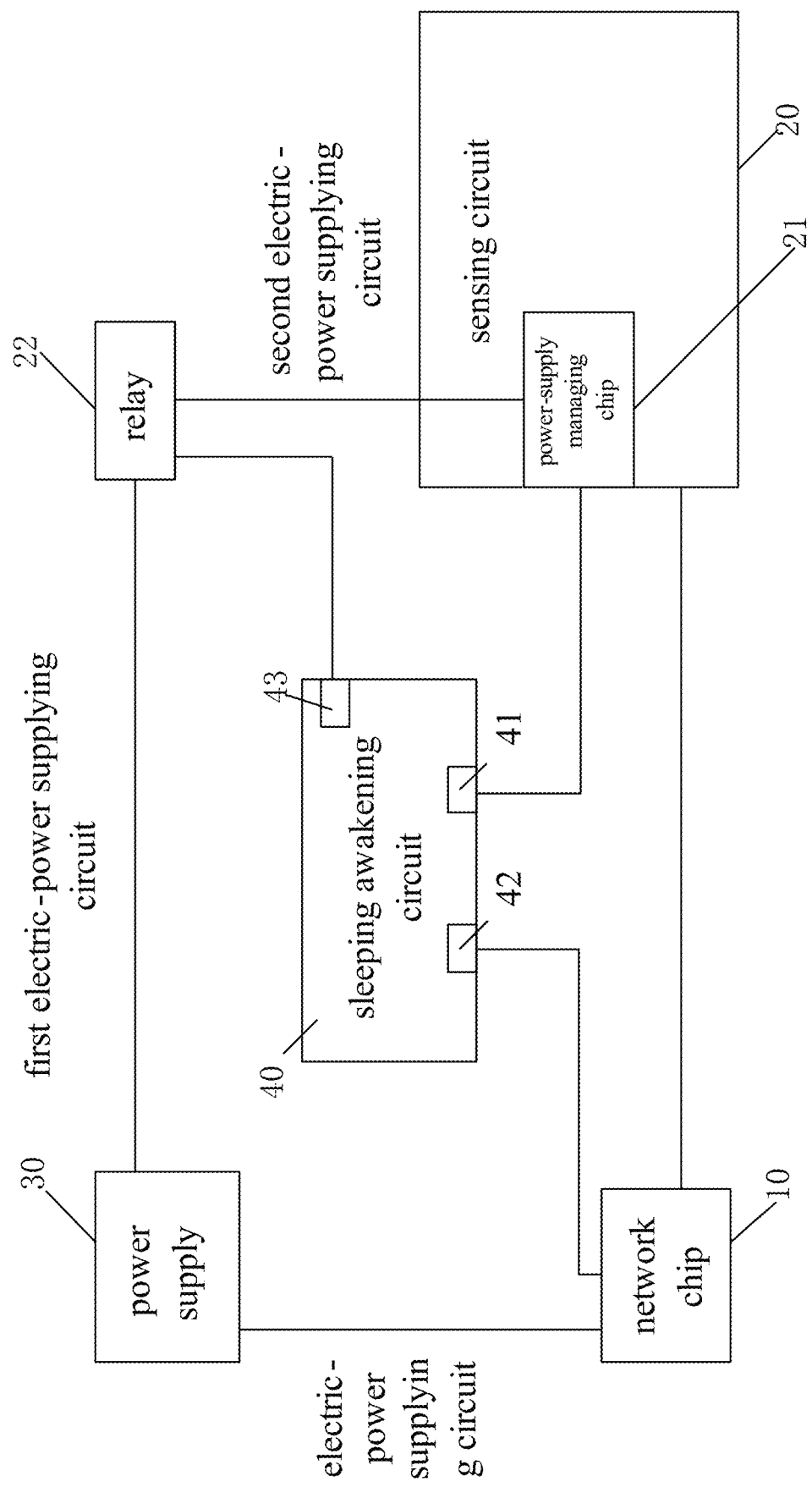
FIG. 2 schematically shows a schematic structural diagram of another X-ray detector according to some embodiments of the present disclosure.

Optionally, referring to FIG. 2, in some embodiments of the present disclosure, the X-ray detector further comprises a sleeping awakening circuit 40, and the sleeping awakening circuit 40 comprises at least: a first voltage inputting interface 41 electrically connected to the sensing circuit 20, a second voltage inputting interface 42 electrically connected to the network chip 10, and a voltage outputting interface 43 connected to a relay 22 between the power-supply managing chip 21 and the power supply 30.

The sensing circuit 20 is configured for, when is in the operating state and has not received the sleeping instruction sent by the external device, inputting a high-level signal to the first voltage inputting interface 41; and when is not in the operating state or has received the sleeping instruction sent by the external device, inputting a high-level signal to the first voltage inputting interface 41, and controlling the network chip 20 to input a low-level signal to the second voltage inputting interface 42, and subsequently input a low-level signal to the first voltage inputting interface 41.

The network chip 10 is further configured for, when receiving an operation instruction sent by the external device, controlling the sensing circuit 20 to input a high-level signal to the first voltage inputting interface 41.

The sleeping awakening circuit 40 is configured for, when the first voltage inputting interface 41 or the second voltage inputting interface 42 is inputted the high-level signal, outputting a low-level signal to the voltage outputting interface 43, to drive the relay 22 to connect a first electric-power supplying circuit between the power-supply managing chip 21 and the power supply 30, whereby the sensing circuit 20 is powered on; and when both of the first voltage inputting interface 41 and the second voltage inputting interface 42 are inputted the low-level signal, outputting a high-level signal to the voltage outputting interface 43, to control the relay to disconnect the first electric-power supplying circuit between the power-supply managing chip 21 and the power supply 30, whereby the sensing circuit 20 is powered off.

In an embodiment of the present disclosure, after the X-ray detector has been turned on, the network chip 10 automatically detects whether to establish a communicative connection with the external device, and, after the communicative connection has been established, controls the power-supply managing chip 21 the output a high-level signal, to cause the sleeping awakening circuit 40 to output a low-level signal to the relay via the voltage outputting interface 43, so that the relay 22 connects the first electric-power supplying circuit between the power-supply managing chip 21 and the power supply 30, and the power-supply managing chip 21 powers on the sensing circuit.

Figure 3:
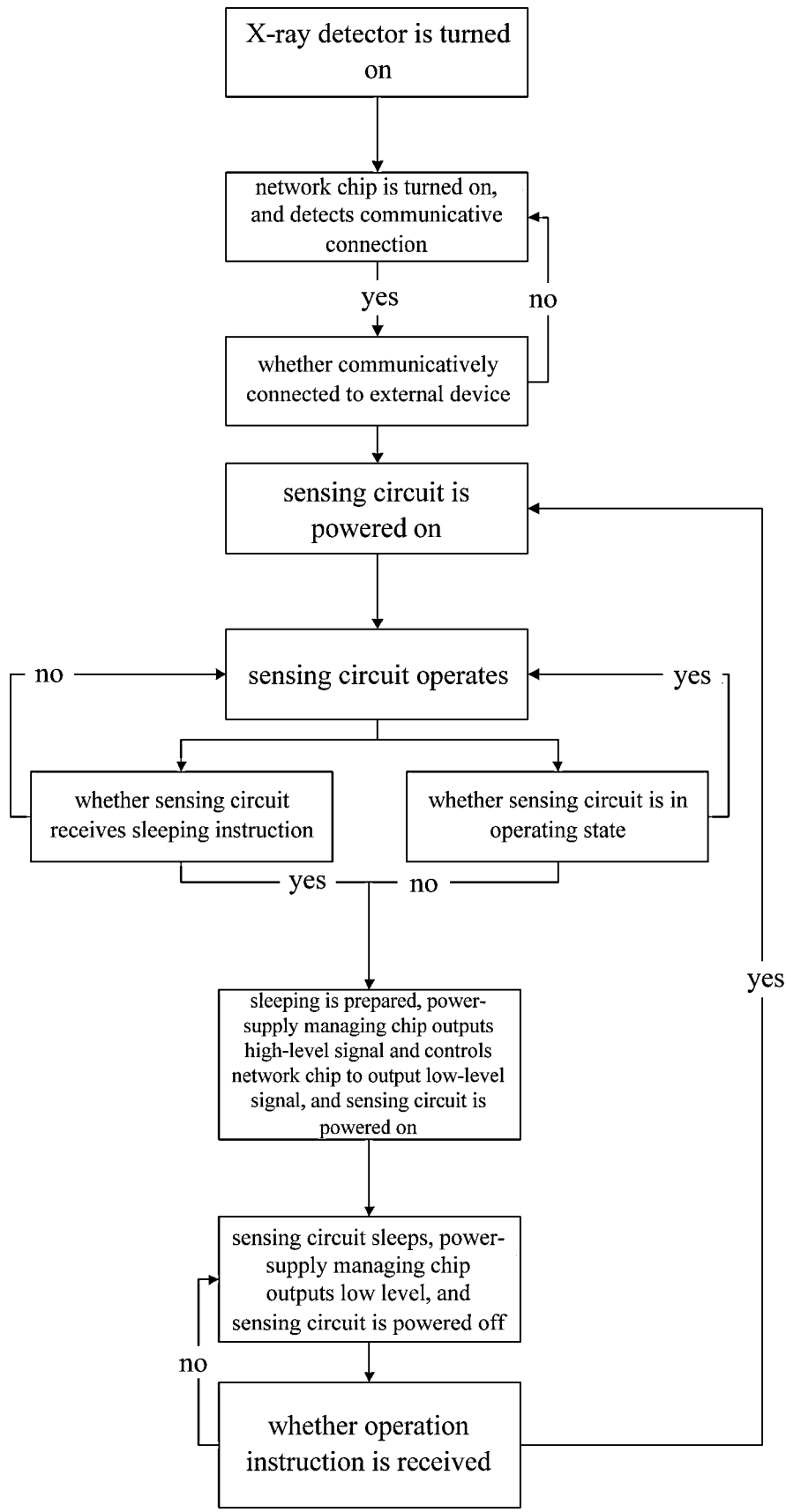
FIG. 3 schematically shows a schematic logic diagram of an X-ray detector according to some embodiments of the present disclosure.

Referring to FIG. 3, the sensing circuit 20, when is in the operating state and has not received the sleeping instruction sent by the external device, via the first voltage inputting interface 41, causes the sleeping awakening circuit 40 to output a low level via the voltage outputting interface 43, and the relay 22, by the driving by the low level, connects the first electric-power supplying circuit between the power-supply managing chip 21 and the power supply 30, whereby the power-supply managing chip 21 powers on the sensing circuit 20.

The sensing circuit 20, when is not in the operating state or has received the sleeping instruction sent by the external device, outputs a high-level signal to the first voltage inputting interface 41, and, by using an instruction signal, instructs the network chip 10 to output a low-level signal to the second voltage inputting interface 42, i.e., lowering the level signal of the second voltage inputting interface 42. At this point the sleeping awakening circuit 40 is merely controlled by the sensing circuit 20, whereby it is realized that the sensing circuit 20 takes over the power-supply managing chip 21 controlled by the sleeping awakening circuit 40. After the signal level of the second voltage inputting interface 42 has been lowered, the sensing circuit 20 inputs a low-level signal via the first voltage inputting interface 41, whereby the voltage outputting interface 43 of the sleeping awakening circuit 40 outputs a high-level signal to the relay 22, the relay 22, by the driving by the high-level signal, disconnects the first electric-power supplying circuit between the power-supply managing chip 21 and the power supply 30, the power-supply managing chip 21 is powered off, and therefore the sensing circuit 20 enters the sleeping state.

The first voltage inputting interface 41 and the second voltage inputting interface 42 are of a wired-and relation, and their truth values are shown in Table 1:

TABLE 1

| serial number | description | first voltage inputting interface operation state | second voltage inputting interface communication state | voltage outputting interface electric-power supplying state | |
|---|---|---|---|---|---|
| 1 | after the system has slept | 0 | sleeping | 0 | not interrupted | 1 | powered-off |
| 2 | state 1 after the system has been awakened | 0 | sleeping | 1 | interrupted | 0 | powered-on |
| 3 | initialization state before the system sleeps | 1 | awakened | 0 | not interrupted | 0 | powered-on |
| 4 | | 1 | awakened | 1 | interrupted | 0 | powered-on |

Optionally, the network chip is further configured for, after driven by the power supply to be powered on, controlling the sensing circuit to input a high-level signal to the first voltage inputting interface, to drive the relay to connect the electric-power supplying circuit between the power-supply managing chip and the power supply, whereby the sensing circuit is powered on.

In an embodiment of the present disclosure, after the X-ray detector has been turned on, the network chip 10 automatically detects whether to establish a communicative connection with the external device, and, after the communicative connection has been established, controls the power-supply managing chip 21 the output a high-level signal, to cause the sleeping awakening circuit 40 to output a low-level signal to the relay via the voltage outputting interface 43, so that the relay 22 connects the first electric-power supplying circuit between the power-supply managing chip 21 and the power supply 30, and the power-supply managing chip 21 powers on the sensing circuit.

Optionally, the network chip comprises a wired network chip 11 and/or a wireless network chip 12.

In an embodiment of the present disclosure, the wired network chip may be a chip provided in the physical link layer (PHY, Port Physical Layer) on the main control panel. It provides physical ports, and may perform communicative connection with the external device by connecting a wired network. The wireless network chip is a Wi-Fi chip that performs communicative connection with the external device via a wireless network. The type of the network chip may be particularly selected to adapt it for the characteristic of the working environment of the X-ray detector, and, certainly, the two types of the network chip may also be simultaneously provided, to adapt for different wired and wireless working environments.

Figure 4:
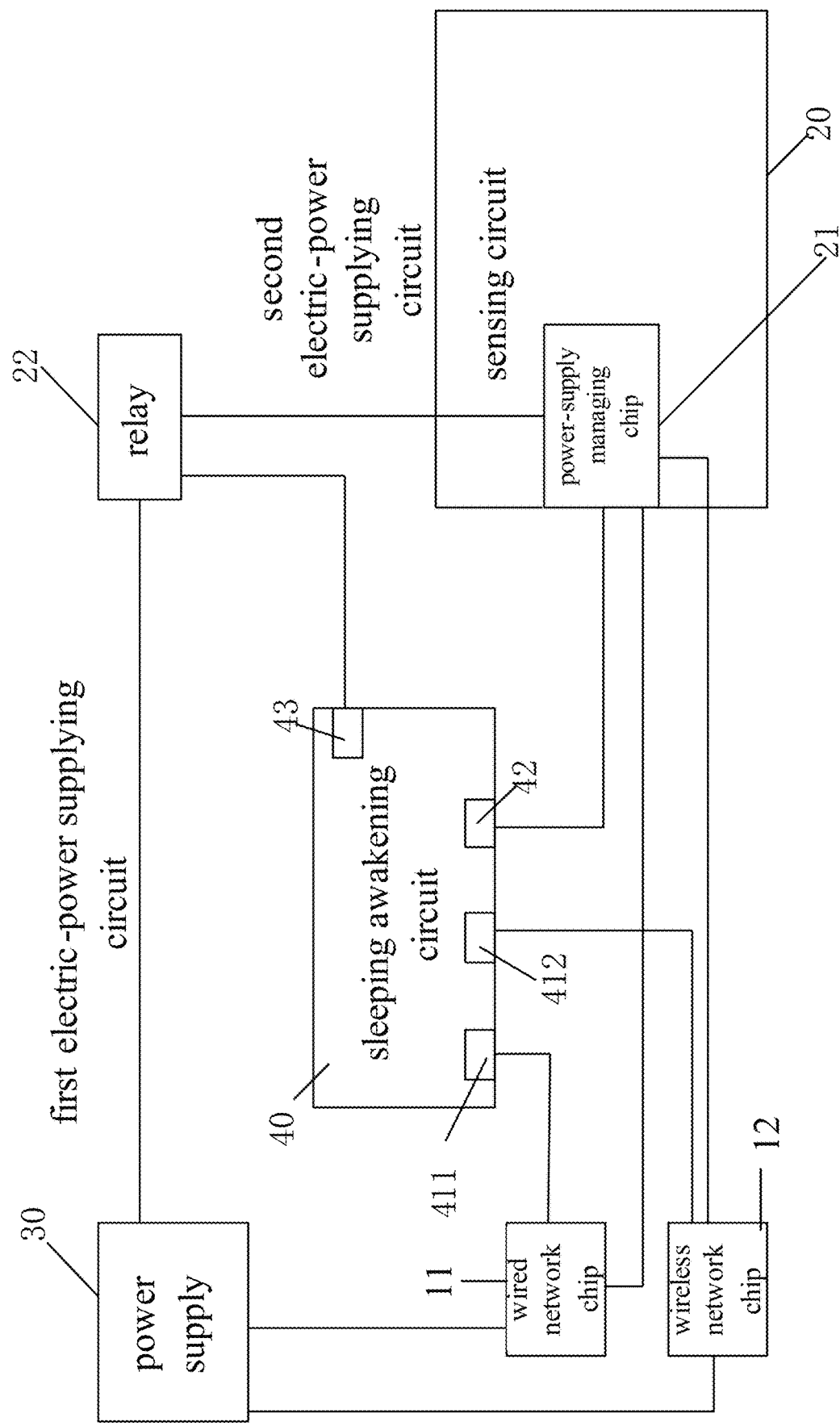
FIG. 4 schematically shows a schematic structural diagram of yet another X-ray detector according to some embodiments of the present disclosure.

Optionally, referring to FIG. 4, when the X-ray detector comprises the wired network chip 11 and the wireless network chip 12, the first voltage inputting interface 41 of the sleeping awakening circuit 40 comprises: a first voltage inputting sub-interface 411 electrically connected to the wired network chip 11, and a second voltage inputting sub-interface 412 electrically connected to the wireless network chip 12.

The sleeping awakening circuit 40 is further configured for, when the first voltage inputting sub-interface 411 or the second voltage inputting sub-interface 412 or the second voltage inputting interface 42 is inputted a high-level signal, outputting a low-level signal to the voltage outputting interface 43, to drive the relay 22 to connect a first electric-power supplying circuit between the power-supply managing chip 21 and the power supply 30, whereby the sensing circuit 20 is powered on; and when all of the first voltage inputting sub-interface 411, the second voltage inputting sub-interface 412 and the second voltage inputting interface 42 are inputted a low-level signal, outputting a high-level signal to the voltage outputting interface 43, to control the relay 22 to disconnect the first electric-power supplying circuit between the power-supply managing chip 21 and the power supply 30, whereby the sensing circuit is powered off.

In an embodiment of the present disclosure, when the first voltage inputting sub-interface 411 or the second voltage inputting sub-interface 412 is inputted a high-level signal 1, that may be deemed as the first voltage inputting interface 41 being inputted a high-level signal. When the first voltage inputting sub-interface 411 and the second voltage inputting sub-interface 412 are inputted a low-level signal 1, that may be deemed as the first voltage inputting interface 41 being inputted a low-level signal. The particular implementing process may refer to the detailed description on the sleeping awakening circuit 40 in the above description, and is not discussed herein further.

When the wired network chip 11 and the wireless network chip 12 exist at the same time, the truth values of the interfaces of the sleeping awakening circuit 40 are shown in Table 2:

TABLE

| serial number | description | first voltage inputting interface operation state | | first voltage inputting sub-interface wired-communication state | | second voltage inputting sub-interface wired-communication state | | voltage outputting interface electric-power supplying state | |
|---|---|---|---|---|---|---|---|---|---|
| 1 | state after sleeping | 0 | sleeping | 0 | not interrupted | 0 | not interrupted | 1 | powered-off |
| 2 | initialization state before sleeping | 1 | awakened | 0 | not interrupted | 0 | not interrupted | 0 | powered-on |
| 3 | state 1 after awakening | 0 | sleeping | 1 | with interruption | 0 | not interrupted | 0 | powered-on |
| 4 | | 1 | awakened | 1 | with interruption | 0 | not interrupted | 0 | powered-on |
| 5 | state 2 after awakening | 0 | sleeping | 0 | not interrupted | 1 | with interruption | 0 | powered-on |
| 6 | | 1 | awakened | 0 | not interrupted | 1 | with interruption | 0 | powered-on |
| 7 | | 0 | sleeping | 1 | with interruption | 1 | with interruption | 0 | powered-on |
| 8 | | 1 | awakened | 1 | with interruption | 1 | with interruption | 0 | powered-on |

Optionally, the X-ray detector further comprises a non-self-locking switch circuit electrically connected to the power supply 30 and configured for performing on-off controlling to the power supply.

Figure 5:
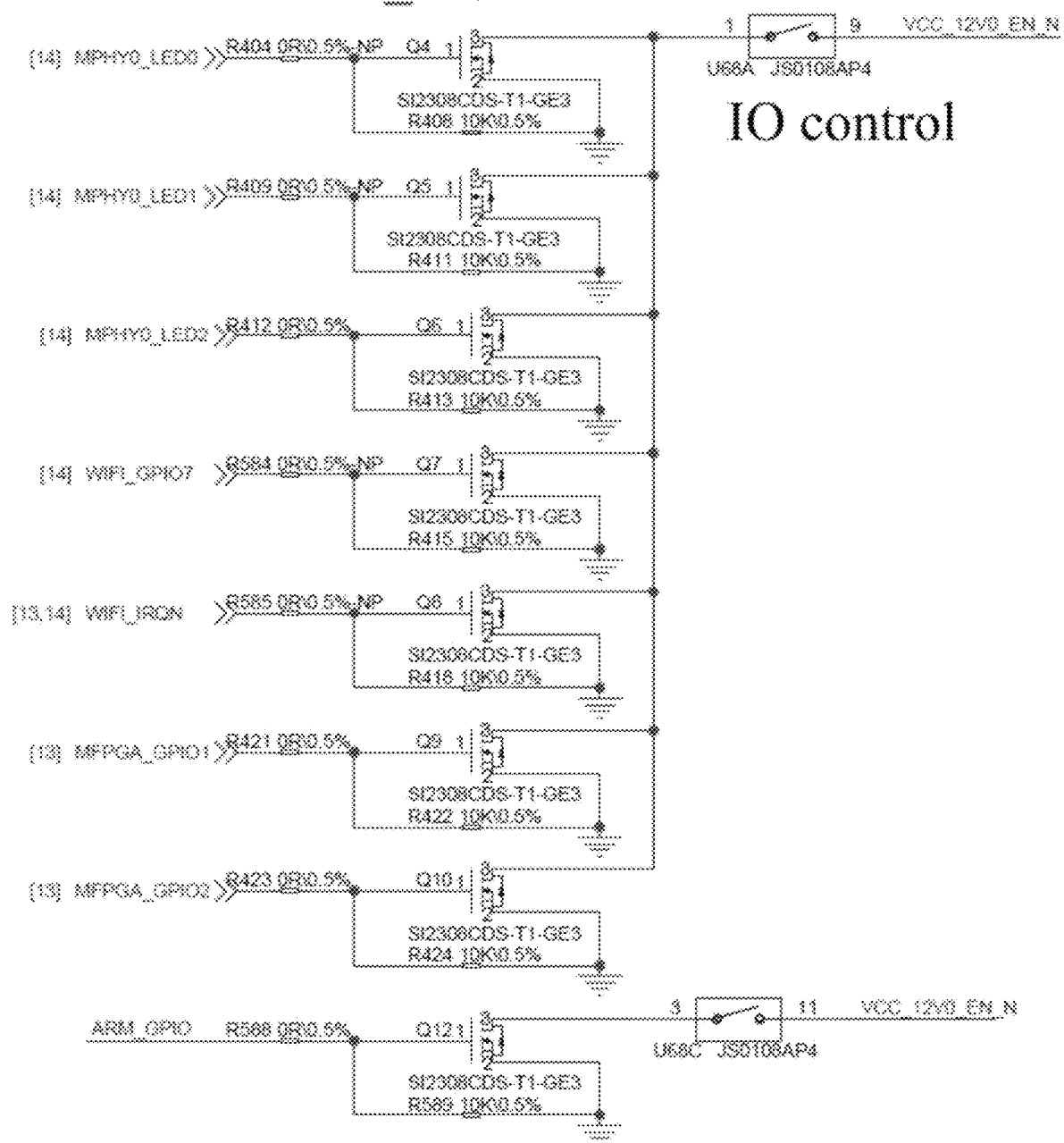
FIG. 5 schematically shows a schematic structural diagram of a sleeping awakening circuit of an X-ray detector according to some embodiments of the present disclosure.

Optionally, referring to FIG. 5, the sleeping awakening circuit 40 according to the present disclosure undergoes circuit controlling by using an OD gate. LED0 is a gate circuit of the wired network chip. LED1 and LED2 are testing circuits of the wired network chip, and are configured for inputting a low-level signal or high-level signal to the first voltage inputting sub-interface forcibly in tests. GPIO7 is a gate circuit of the wireless network chip. IPCN is a testing circuit of the wireless network chip, and is configured for inputting a low-level signal or high-level signal to the second voltage inputting sub-interface forcibly in tests. GPIO1 is a gate circuit of the power-supply managing chip. GPIO2 is a testing circuit of the power-supply managing chip, and is configured for inputting a low-level signal or high-level signal to the second voltage inputting interface forcibly in tests. ARM_GPIO is a testing circuit of the system, and is configured for turning on the system forcibly in tests.

In an embodiment of the present disclosure, it is taken into consideration that, although the self-locking-type switch is simply controlled and has a lower cost, the self-locking key has the disadvantage of a short service life and the disadvantage that, after the key is pressed, the key sinks. Moreover, because the self-locking key has a locking device, usually the key has a large size, which is adverse to miniaturization design. Therefore, in the present disclosure, the non-self-locking switch circuit is selected to control the turning-on of the power supply of the X-ray detector, whereby reducing the size of the switch, and increasing the service life of the switch key.

Figure 6:
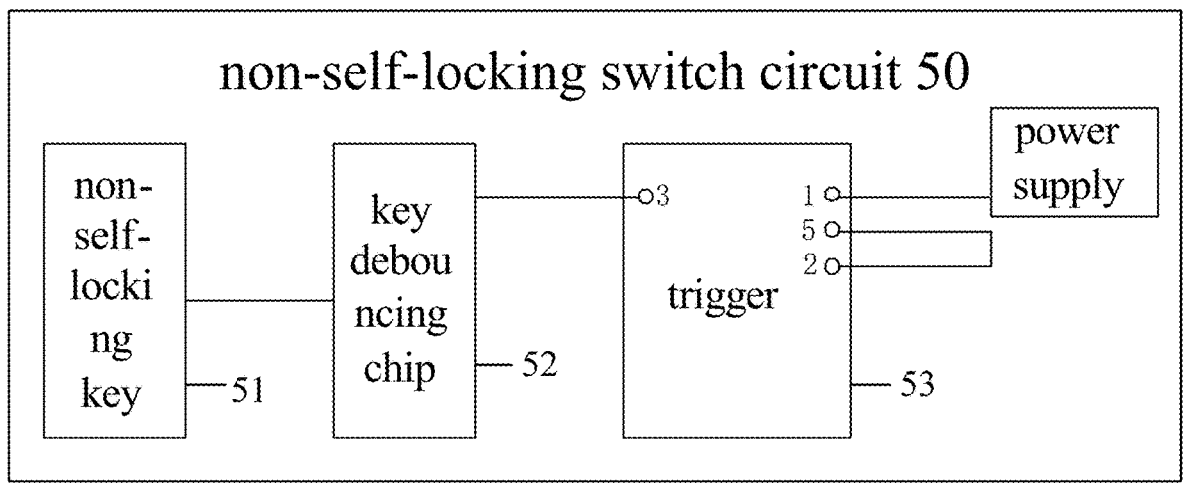
FIG. 6 schematically shows a schematic structural diagram of a non-self-locking switch circuit of an X-ray detector according to some embodiments of the present disclosure.

Optionally, referring to FIG. 6, the non-self-locking switch circuit 50 comprises at least a non-self-locking key 51, a key debouncing chip 52 and a trigger 53 that are electrically connected;
  the non-self-locking key 51 is configured for, each time pressed, bouncing, and outputting one pressing signal to the key debouncing chip 52;
  the key debouncing chip 52 is configured for performing debouncing processing to the pressing signal, and sending a clock-pulse signal to the trigger 53; and
  the trigger 53 is configured for, each time receives one clock-pulse signal, changing the on-off state of the power supply 30 one time.

In an embodiment of the present disclosure, the pressing signal generated by each time of the pressing of the non-self-locking key is processed by the key debouncing chip 52, one clock-pulse signal is outputted to the base pin 3 of the trigger 53, subsequently the state of the base pin 5 of the trigger 53 is transmitted to the base pin 1, and, simultaneously, the base pin 2 is connected to the base pin 5. Because the states of the base pin 2 and the base pin 1 are opposite, each time the non-self-locking key 51 is pressed, the state of the base pin 1 of the trigger 53 changes one time, thereby realizing the on-off controlling on the power supply.

Figure 7:
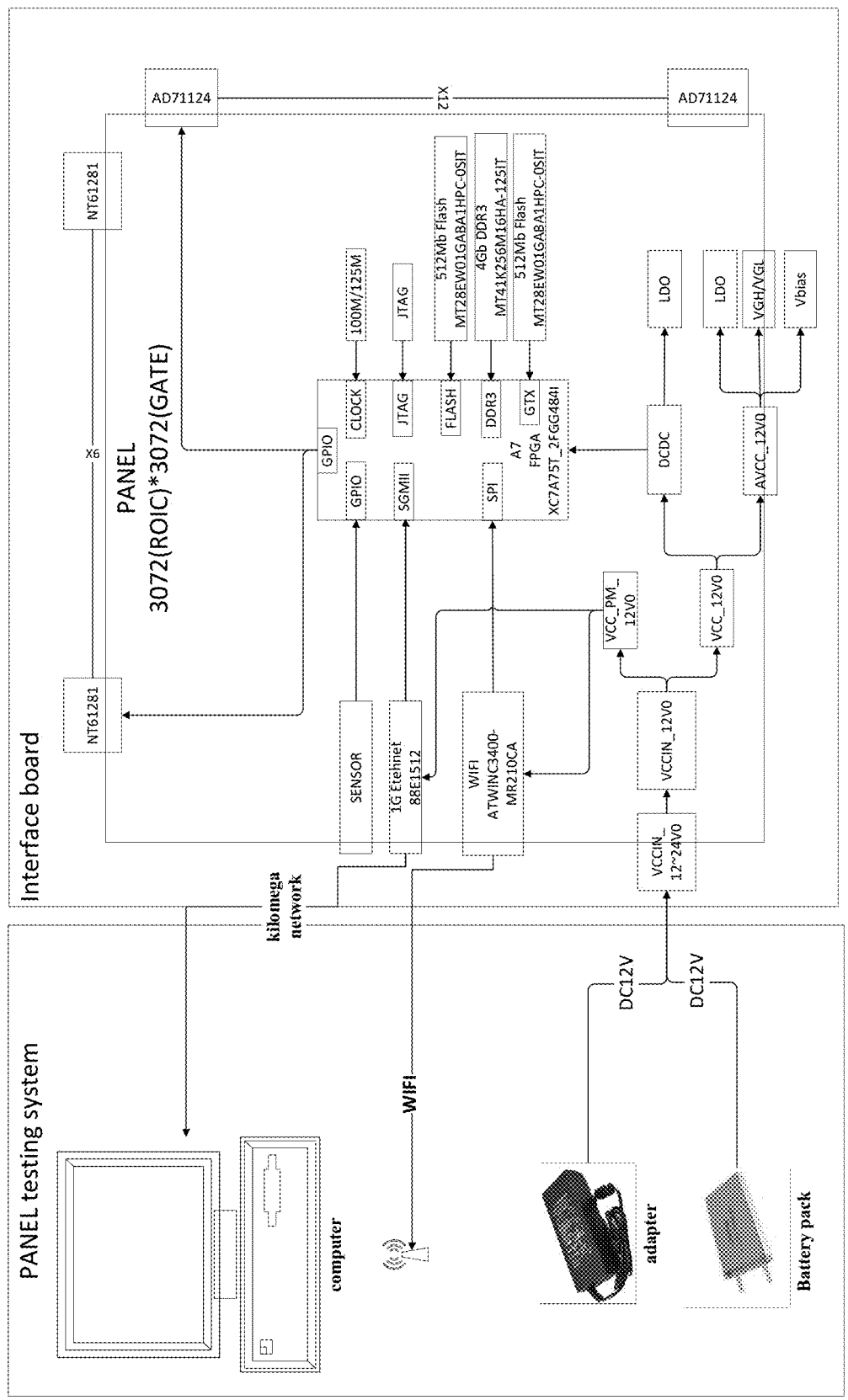
FIG. 7 schematically shows a schematic systematic diagram of an X-ray detector according to some embodiments of the present disclosure.

Optionally, referring to FIG. 7, the sensing circuit 20 comprises at least an FPGA chip, a ROIC chip, a GATE IC chip, a detecting panel and a buffer chip that are provided on a main control panel;
  the FPGA chip and a PCB trace of a circuit board are provided on the main control panel in a parallel-winding mode;
  the FPGA chip is configured for, when receiving the operation instruction sent by the external device, sending a configuring instruction and a time-sequence signal to the buffer chip, and sending a controlling signal and a time-sequence signal to the GATE IC chip;
  the buffer chip is configured for sending in parallel the configuring instruction and the time-sequence signal to a plurality of channels of the ROIC chip;
  the GATE IC chip is configured for, based on the controlling signal and the time-sequence signal, controlling the detecting panel to scan X-ray charge signals line by line;
  the ROIC chip is configured for, based on the configuring instruction, completing self-configuration, and based on the time-sequence signal, reading the X-ray charge signals line by line from the GATE IC chip; and converting the X-ray charge signals into X-ray level signals; and
  the FPGA chip is configured for reading from the ROIC chip a plurality of lines of the X-ray level signals in parallel, and sending the X-ray level signals to the external device.

It should be noted that the FPGA chip is used as a half-customized circuit, which does not only overcome the disadvantages of customized circuits, but also overcomes the disadvantage of the original programmable devices that the quantity of the gate circuits is limited.

Figure 8:
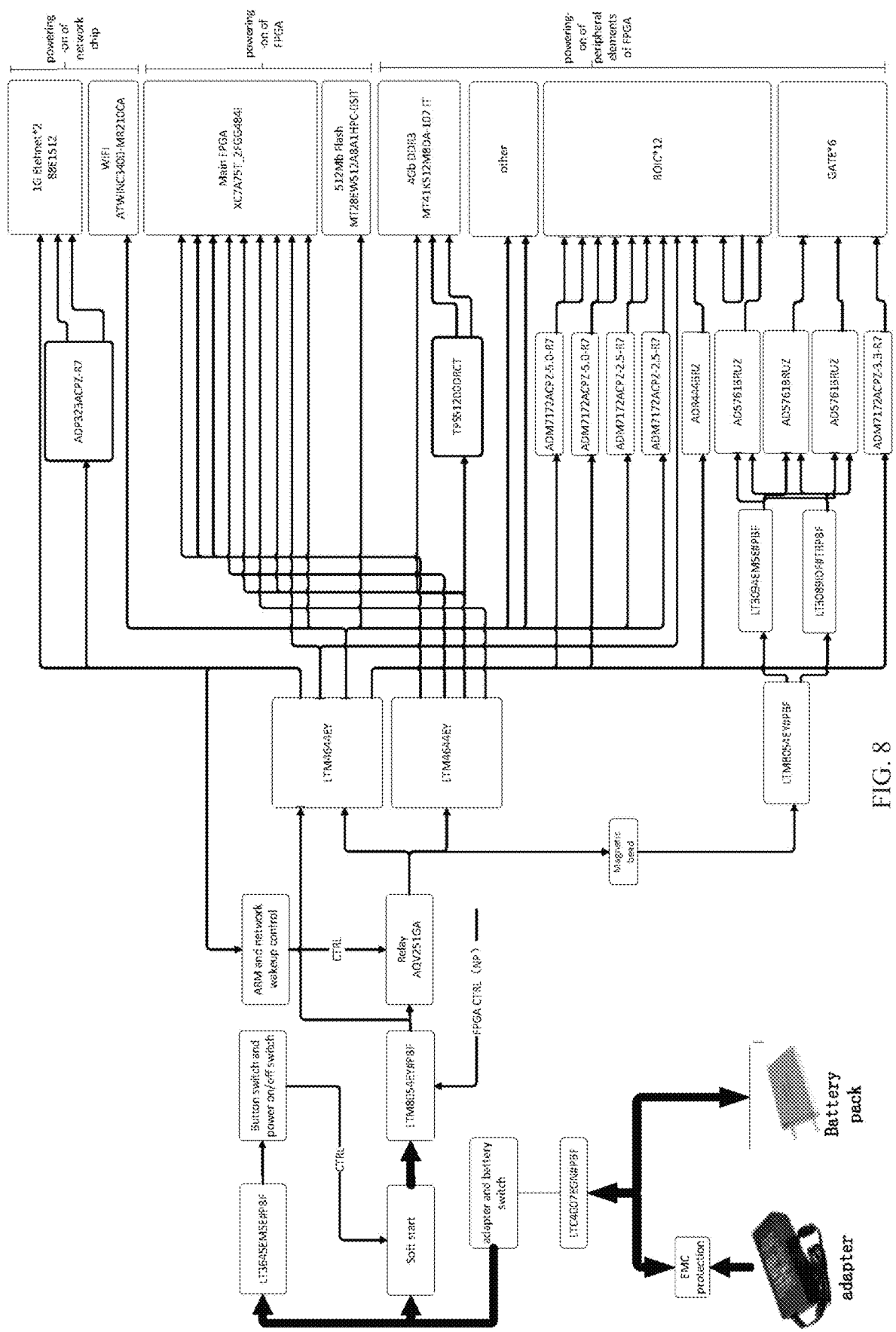
FIG. 8 schematically shows a flow chart of the powering-on of an X-ray detector according to some embodiments of the present disclosure.

In an embodiment of the present disclosure, after the X-ray detector has been turned on, the system powers on the controlling system by using the power supply 30, and after the minimum system powering-on has been completed, an FPGA (Field Programmable Gate Array) loads a program in a FLASH register and starts operating. The FPGA, after completing the loading of the operating program, continuously controls a peripheral interface to be powered on. Particularly, referring to FIG. 8, firstly the wired network chip and the wireless network chip are powered on, and subsequently, referring to the above description, the network chip controls the power-supply managing chip to power on the FPGA in the sensing circuit, and subsequently power on the FLASH register and a DDR3 memory, whereby the FPGA loads the program and data from the FLASH register and the DDR3 memory. After the FPGA powering-on and the program loading have been completed, the ROIC (Read Out Integrated Circuit) and the GATE IC (gate chip) externally connected to the FPGA chip are powered on.

Figure 9:
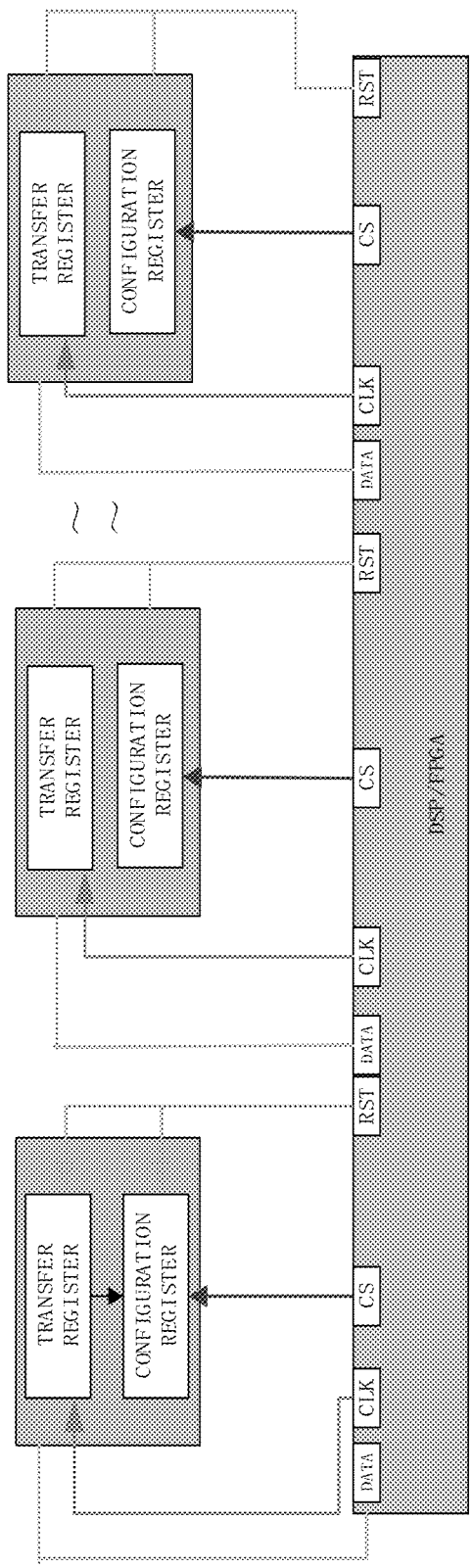
FIG. 9 schematically shows a schematic diagram of the winding of the FPGA chip of an X-ray detector according to some embodiments of the present disclosure.

The external device sends the operation instruction to the main control panel of the X-ray detector via the interfaces of the network chip, and the main control panel receives the operation instruction, checks the operation instruction as not erroneous, responds and replies to the external device, parses the operation instruction, and, by using the ROIC signal in FIG. 9, sends a ROIC configuring instruction to a ROIC board via a SPI protocol interface. After the ROIC chip has completed the configuration based on the configuring instruction, the FPGA chip, by sending to the ROIC chip the required AFE signal (SYNC and ACLK) and DCLK clock signal, performs time-schedule controlling to the ROIC. Further, the FPGA chip divides the SPI signal and the clock signal into a plurality of signals by using the buffer chip, sends the divided signals in parallel to the ROIC chip, and simultaneously sends ROIC data and clock signal to the main control panel. In order to realize the functions of self-adaption and expansibility, the mode of configuring the ROIC is modified in terms of the hardware, by changing the daisy-chain-type sequential configuring mode into the parallel configuring mode, and in order to satisfy the requirements on the SPI time sequence, at the same time it is required to ensure that the SPI traces of the N ROICs of the FPGA have equal lengths and diameters, which ensures the evenness of all of the channels of the ROIC chip.

Figure 10:
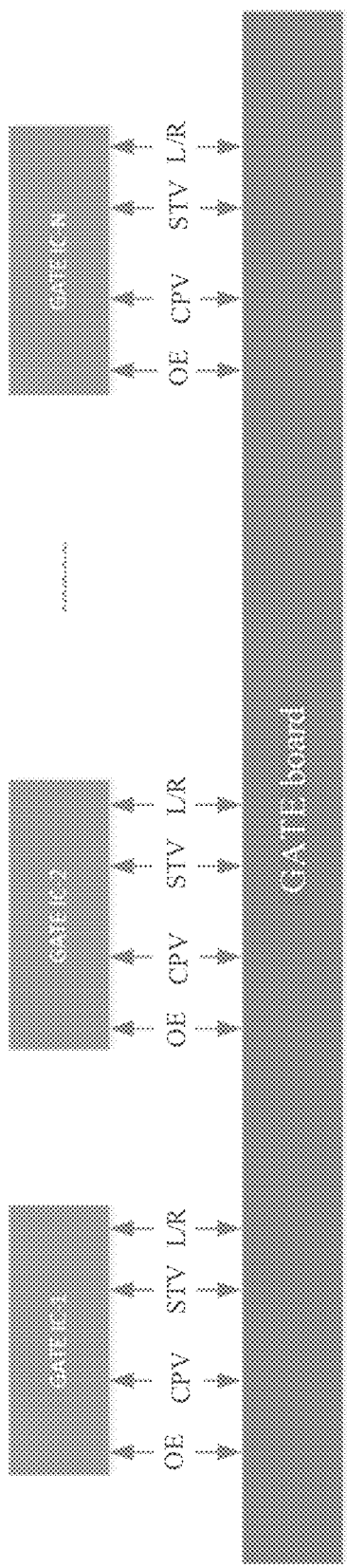
FIG. 10 schematically shows a schematic diagram of the winding of the GATE IC chip of an X-ray detector according to some embodiments of the present disclosure.

The FPGA, after completely configured, sends controlling signals (CPV, STV and OE) and voltages (VGL and VGH) simultaneously to the GATE IC chip, so that the GATE IC chip controls the detecting panel to perform X-ray signal collection. In other words, the GATE IC chip, after controls the detecting panel to completely collect a certain line, closes that line, and opens the next line to collect, to realize the function of scanning the X-ray signal line by line. Further, referring to FIG. 10, the GATE board receives the controlling time-sequence signals and the voltages of the GATE IC, and, by driving the GATE IC chip, controls TFT (Thin Film Transistor) switches of Panel (the detecting panel) to be turned on line by line. Likewise, in order to realize the functions of self-adaption and expansibility, the mode of configuring the GATE IC is modified in terms of the hardware, by changing the traditional daisy-chain sequential executing mode into the parallel independent configuring mode, which can realize the function of simultaneously turning on a plurality of or certain GATEs.

The ROIC chip, by using an integrating circuit, converts the X-ray charge signals collected by the GATE IC chip into the X-ray level signals, and, by A/D digital-to-analogue conversion, converts the level signal into a digital signal and outputs to the FPGA chip.

Simultaneously when the FPGA chip is controlling the ROIC chip to collect data, the FPGA chip packages the X-ray digital signal acquired from the GATE IC chip and sends to the network chip, and the network chip sends the X-ray digital signal to the external device.

Figure 11:
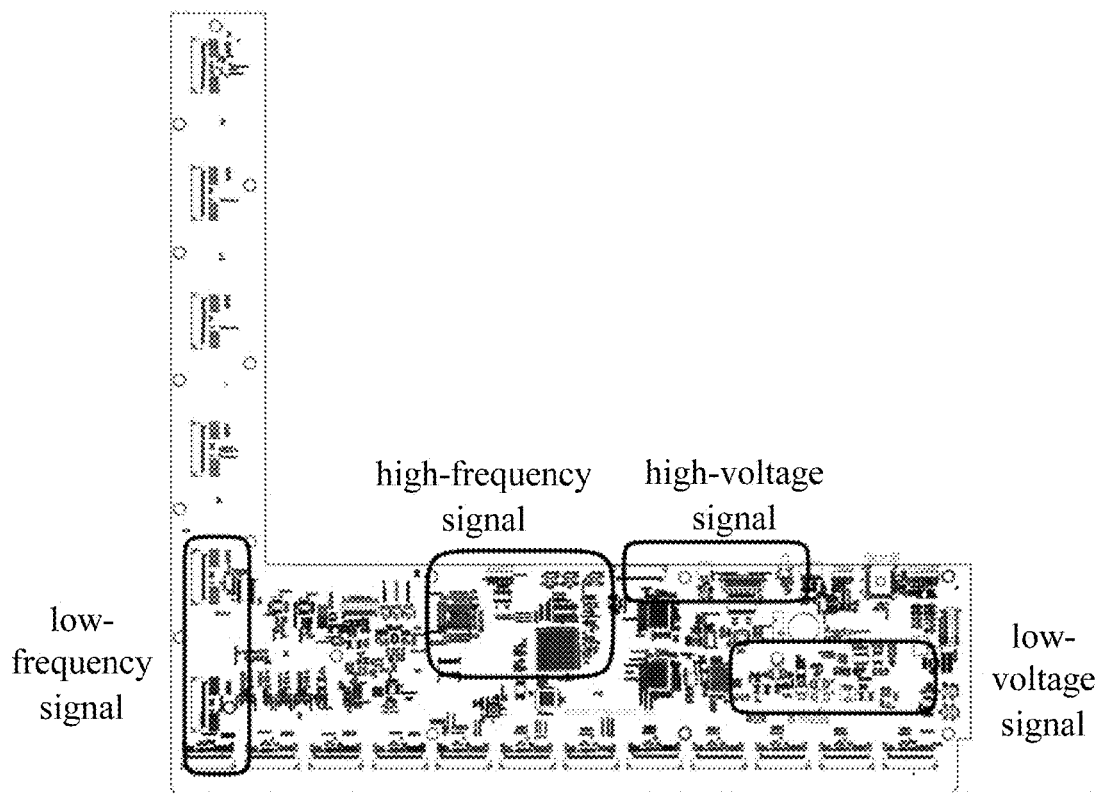
FIG. 11 schematically shows a circuit board diagram of an X-ray detector according to some embodiments of the present disclosure.

Optionally, referring to FIG. 11, a circuit board of the X-ray detector comprises a high-frequency-signal-element region, a low-frequency-signal-element region, a high-voltage-signal-element region and a low-voltage-signal-element region.

In an embodiment of the present disclosure, in order to ensure that the system has an excellent electrical performance, on the driver board of the X-ray detector, high-voltage and low-voltage elements are separated, high-frequency and low-frequency elements are separated, high-power and low-power elements are separated, and analog voltage elements and digital voltage elements are separated. The high-frequency-signal-element region may contain the relevant elements of the components whose operating voltage is a high-frequency voltage, such as the FPGA chip, the ROIC chip, the network chip and the clock chip. The low-frequency-signal-element region may contain the relevant elements of the components whose operating voltage is a low-frequency voltage, such as the key circuit and the power supply. The high-voltage-signal-element region may contain the relevant elements of the components whose operating voltage is a high voltage, such as the GATE IC chip. The low-voltage-signal-element region may contain the relevant elements of the components whose operating voltage is a low voltage, such as the FPAG chip. Certainly, the above are merely exemplary descriptions, which may be particularly configured according to practical demands, and are not limited herein.

In the present disclosure, by providing the high- and low-frequency elements and the high- and low-voltage elements separately on the driver board, the anti-interference performance of the system can be improved, and the noise input of the system can be reduced.

Figure 12:
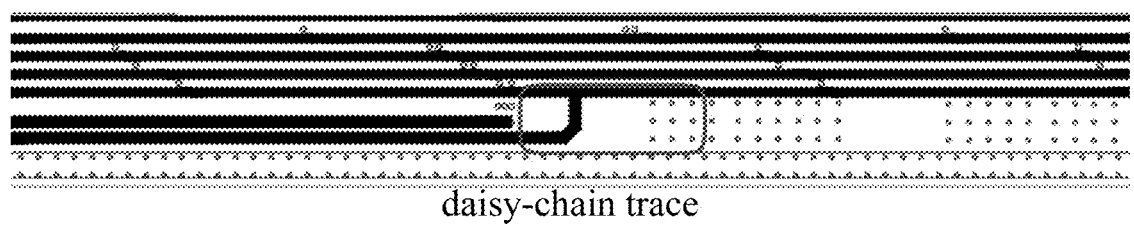
FIG. 12 schematically shows a schematic diagram of the winding of the power supply of an X-ray detector according to some embodiments of the present disclosure.

Optionally, referring to FIG. 12, wiring of the power supply is of a tree-like structure, whereby impedances from the power supply to the chips of the X-ray detector are equal.

Figure 13:
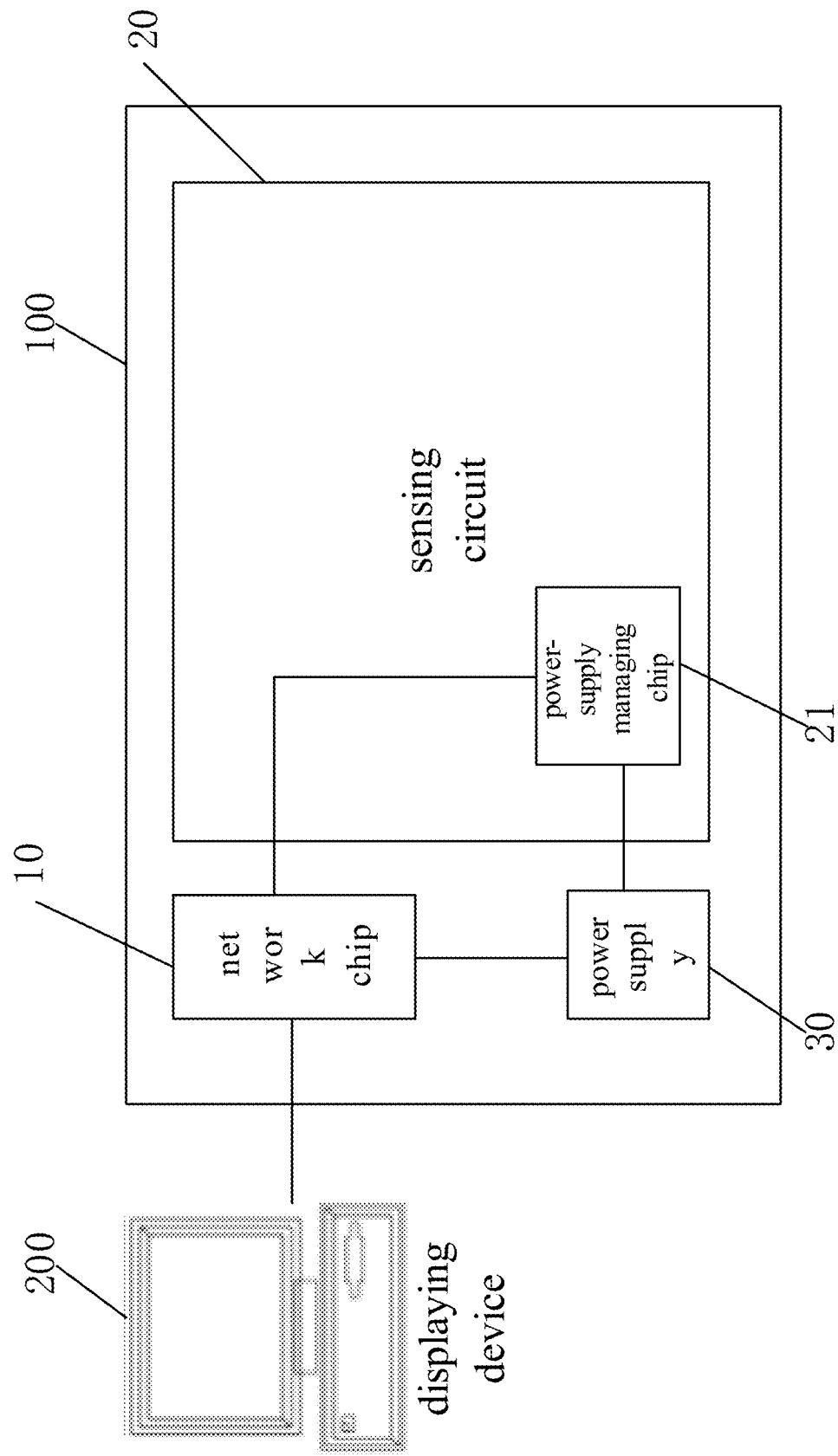
FIG. 13 schematically shows a schematic structural diagram of an X-ray detecting system according to some embodiments of the present disclosure.

FIG. 13 schematically shows a schematic structural diagram of an X-ray detecting system. The X-ray detecting system comprises a displaying device 200 and the X-ray detector 100 stated above, and the displaying device is communicatively connected to the X-ray detector 100 via the network chip 10.

It should be understood that, although the steps in the flow charts in the drawings are shown sequentially according to the indication by the arrows, those steps are not necessarily performed sequentially according to the sequence indicated by the arrows. Unless expressly described herein, the sequence of the performances of those steps are not strictly limited, and they may be performed in other sequences. Furthermore, at least some of the steps in the flow charts in the drawings may comprise a plurality of sub-steps or a plurality of stages, wherein those sub-steps or stages are not necessarily completely performed at the same one moment, but may be performed at different moments, and their performance sequence is not necessarily sequential performance, but may be performance alternate with at least some of the other steps or the sub-steps or stages of the other steps.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. An X-ray detector, comprising:
   a network chip,
   a power supply, and
   a sensing circuit;
   the sensing circuit comprises a power-supply managing chip, and the power-supply managing chip is electrically connected to the network chip and the power supply;
   the power supply is configured for supplying electric power to the network chip and the power-supply managing chip of the sensing circuit;
   the power-supply managing chip is configured for, when turned on, supplying electric power to the sensing circuit;
   the sensing circuit is configured for, when receiving a sleeping instruction sent by an external device or is not in an operating state, turning off the power-supply managing chip, to enter a sleeping state; and
   the network chip is configured for, when receiving an operation instruction sent by the external device, controlling the power-supply managing chip to be turned on, whereby the sensing circuit exits the sleeping state.

2. The X-ray detector according to claim 1, further comprising:
   a relay between the power supply managing chip and the power supply, a sleeping awakening circuit comprising at least:
      a first voltage inputting interface electrically connected to the sensing circuit,
      a second voltage inputting interface electrically connected to the network chip, and
      a voltage outputting interface connected to the relay; and
   a first electric-power supplying circuit between the power-supply managing chip and the power supply;
   the sensing circuit is configured for, when is in the operating state and has not received the sleeping instruction sent by the external device, inputting a high-level signal to the first voltage inputting interface; and when is not in the operating state or has received the sleeping instruction sent by the external device, inputting a high-level signal to the first voltage inputting interface, and controlling the network chip to input a low-level signal to the second voltage inputting interface, and subsequently input a low-level signal to the first voltage inputting interface;
   the network chip is further configured for, when receiving the operation instruction sent by the external device, controlling the sensing circuit to input a high-level signal to the first voltage inputting interface; and
   the sleeping awakening circuit is configured for, when the first voltage inputting interface or the second voltage inputting interface is inputted the high-level signal, outputting a low-level signal to the voltage outputting interface, to drive the relay to connect the first electric-power supplying circuit between the power-supply managing chip and the power supply, whereby the sensing circuit is powered on; and when both of the first voltage inputting interface and the second voltage inputting interface are inputted the low-level signal, outputting a high-level signal to the voltage outputting interface, to control the relay to disconnect the first electric-power supplying circuit between the power-supply managing chip and the power supply, whereby the sensing circuit is powered off.

3. The X-ray detector according to claim 2, wherein
   the network chip is further configured for, after driven by the power supply to be powered on, controlling the sensing circuit to input a high-level signal to the first voltage inputting interface, to drive the relay to connect the first electric-power supplying circuit between the power-supply managing chip and the power supply, whereby the sensing circuit is powered on.

4. The X-ray detector according to claim 1, wherein the network chip comprises a wired network chip and/or a wireless network chip.

5. The X-ray detector according to claim 4, wherein the network chip comprises the wired network chip and the wireless network chip,
   the X-ray detector further comprises:
      a relay between the power supply managing chip and the power supply;
      a sleeping awakening circuit comprises at least:
         a first voltage inputting interface comprises:
            a first voltage inputting sub-interface electrically connected to the wired network chip;
            a second voltage inputting sub-interface electrically connected to the wireless network chip;
         a second voltage inputting interface electrically connected to the network chip; and
         a voltage outputting interface connected to the relay;
   and
   a first electrical-power supplying circuit between the power-supply managing chip and the power supply;

the sleeping awakening circuit is further configured for, when the first voltage inputting sub-interface or the second voltage inputting sub-interface is inputted a high-level signal, outputting a low-level signal to the voltage outputting interface, to drive the relay to connect the first electric-power supplying circuit between the power-supply managing chip and the power supply, whereby the sensing circuit is powered on; and when the first voltage inputting sub-interface, the second voltage inputting sub-interface, and the second voltage inputting interface are inputted a low-level signal, outputting a high-level signal to the voltage outputting interface, to control the relay to disconnect the first electric-power supplying circuit between the power-supply managing chip and the power supply, whereby the sensing circuit is powered off.

6. The X-ray detector according to claim 5, wherein the wired network chip comprises testing circuits configured for inputting a low-level signal or a high-level signal to the first voltage inputting sub-interface forcibly in tests;

the wireless network chip comprises a testing circuit configured for inputting a low-level signal or a high-level signal to the second voltage inputting sub-interface forcibly in tests; and the power-supply managing chip comprises a testing circuit configured for inputting a low-level signal or a high-level signal to the second voltage inputting interface forcibly in tests.

7. The X-ray detector according to claim 1, further comprising:

a non-self-locking switch circuit electrically connected to the power supply and configured for performing on-off controlling to the power supply.

8. The X-ray detector according to claim 7, wherein the non-self-locking switch circuit comprises at least a non-self-locking key, a key debouncing chip, and a trigger that are electrically connected;

the non-self-locking key is configured for, each time pressed, bouncing, and outputting one pressing signal to the key debouncing chip;

the key debouncing chip is configured for performing debouncing processing to the one pressing signal, and sending a clock-pulse signal to the trigger; and the trigger is configured for, each time receives one instance of the clock-pulse signal, changing an on-off state of the power supply one time.

9. The X-ray detector according to claim 1, further comprising:

a circuit board comprising a high-frequency-signal-element region, a low-frequency-signal-element region, a high-voltage-signal-element region, and a low-voltage-signal-element region.

10. The X-ray detector according to claim 9, wherein the high-frequency-signal-element region contains relevant elements of components, whose operating voltage is a high-frequency voltage;

the low-frequency-signal-element region contains relevant elements of components, whose operating voltage is a low-frequency voltage;

the high-voltage-signal-element region contains relevant elements of components, whose operating voltage is a high voltage; and the low-voltage-signal-element region contains relevant elements of components, whose operating voltage is a low voltage.

11. The X-ray detector according to claim 1, wherein the power supply comprises wiring of a tree-like structure, whereby impedances from the power supply to the network chip are equal.

12. An X-ray detecting system, comprising:

the X-ray detector according to claim 1, and a displaying device communicatively connected to the X-ray detector via the network chip.

* * * * *